United States Patent [19]

Diehl et al.

[11] Patent Number: 4,994,356
[45] Date of Patent: Feb. 19, 1991

[54] SOLID PARTICLE DISPERSIONS OF FILTER DYES FOR PHOTOGRAPHIC ELEMENTS

[75] Inventors: Donald R. Diehl; Glenn M. Brown, both of Rochester, N.Y.

[73] Assignee: Eastman Kodak Company, Rochester, N.Y.

[21] Appl. No.: 504,469

[22] Filed: Apr. 4, 1990

[51] Int. Cl.[5] .................................................. G03C 1/06
[52] U.S. Cl. ..................................... 430/522; 430/507; 430/594
[58] Field of Search ................ 430/522, 507, 510, 594

[56] References Cited

U.S. PATENT DOCUMENTS

| | | | |
|---|---|---|---|
| 3,502,474 | 3/1970 | Tsuda et al. | 430/522 |
| 3,512,983 | 5/1970 | Watanabe et al. | 430/522 |
| 4,294,916 | 10/1981 | Postle et al. | 430/522 |
| 4,294,917 | 10/1981 | Postle et al. | 430/522 |
| 4,855,221 | 8/1989 | Factor et al. | 430/522 |
| 4,857,446 | 8/1989 | Diehl et al. | 430/510 |
| 4,940,654 | 7/1990 | Diehl et al. | 430/522 |

FOREIGN PATENT DOCUMENTS

| | | | |
|---|---|---|---|
| 0487409 | 10/1952 | Canada | 430/522 |
| 1468094 | 12/1966 | France | 430/522 |

OTHER PUBLICATIONS

Ser. No. 373,747, Jul. 1979, Diehl et al.
Ser. No. 373,749, Oct. 1983, Diehl et al.

*Primary Examiner*—Richard L. Schilling
*Assistant Examiner*—Thomas R. Neville
*Attorney, Agent, or Firm*—Andrew J. Anderson

[57] ABSTRACT

Solid particle dispersions of dyes according to the formula:

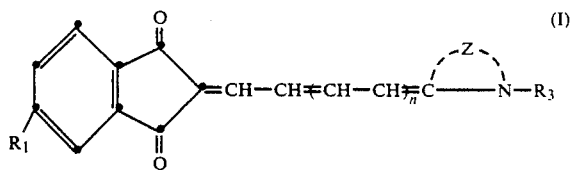

are disclosed as filter dyes for photographic elements.

In this formula, n is 0 or 1.

$R_1$ is $CO_2H$ or $NHSO_2R_2$ where $R_2$ is substituted or unsubstituted alkyl or substituted or unsubstituted aryl.

$R_3$ is substituted or unsubstituted alkyl or substituted or unsubstituted aryl.

Z represents the atoms necessary to complete a substituted or unsubstituted heterocyclic nucleus.

13 Claims, No Drawings

SOLID PARTICLE DISPERSIONS OF FILTER DYES FOR PHOTOGRAPHIC ELEMENTS

FIELD OF THE INVENTION

This invention relates to dyes, particularly dyes useful as filter dyes, especially in photographic elements.

BACKGROUND OF THE INVENTION

Photographic materials often contain filter dyes to absorb light from different regions of the spectrum, such as red, blue, green, ultraviolet, and infrared, to name a few. These filter dyes are often required to perform the function of absorbing light during exposure of the material so as to prevent or at least inhibit light of a region of the spectrum from reaching at least one of the radiation-sensitive layers of the element.

After processing of the element, however, the continued presence of the filter dye will adversely affect the image quality of the photographic material. It is therefore desirable to use filter dyes that will be solubilized and removed or at least decolorized during photographic processing. Dyes that are easily solubilized, however, tend to wander throughout the photographic material during coating, adversely affecting the final image quality.

To prevent dye wandering, the dyes are often coated with a mordant to bind the dye in the layer in which it is coated. Dye mordants, while often useful, tend to either bind the dye too strongly, inhibiting solubilization of the dye during photographic processing, or too weakly, thus not preventing dye wandering.

It would therefore be highly desirable to provide a filter dye for use in photographic elements that does not wander during coating without requiring a mordant, is fully solubilized during processing for decolorizing and/or removal.

SUMMARY OF THE INVENTION

According to the invention, there is provided a photographic element having a layer comprising a hydrophilic binder and, as a filter dye, a solid particle dispersion of a compound having the formula:

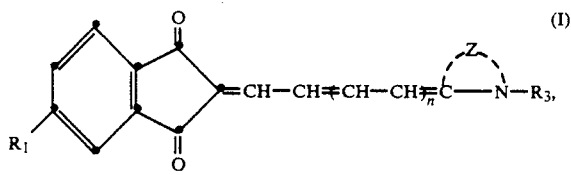

wherein
n is 0 or 1,
$R_1$ is $CO_2H$, or $NHSO_2R_2$ where $R_2$ is substituted or unsubstituted alkyl or substituted or unsubstituted aryl,
$R_3$ is substituted or unsubstituted alkyl or substituted or unsubstituted aryl, and
Z represents the atoms necessary to complete a substituted or unsubstituted heterocyclic nucleus.

Solid particle dispersions of the compound of formula (I) are useful as general purpose filter dyes, alone or in combination with other filter dyes in photographic elements. They are insoluble at coating pH's of 6 or less (generally 4 to 6) and soluble at processing pH's of 8 or more (generally 8 to 12), so that they do not interact with other components of the photographic element, yet still are fully solubilized during photographic processing.

DESCRIPTION OF THE PREFERRED EMBODIMENTS

According to formula (I), $R_1$ represents $CO_2H$ or $NHSO_2R_2$ where $R_2$ is substituted or unsubstituted alkyl or substituted or unsubstituted aryl. In a preferred embodiment, $R_1$ is $CO_2H$. Also according to formula (I), $R_3$ is substituted or unsubstituted alkyl or substituted or unsubstituted aryl. Preferably, $R_2$ and $R_3$ are each independently substituted or unsubstituted alkyl of 1 to 6 carbon atoms or substituted or unsubstituted aryl of 6 to 12 carbon atoms. The alkyl or aryl group may be substituted with any of a number of substituents as is known in the art, other than those, such as sulfo substituents, that would tend to increase the solubility of the dye so much as to cause it to become soluble at coating pH's. Examples of useful substituents include halogen, alkoxy, ester groups, amido, acyl, and alkylamino. Examples of alkyl groups include methyl, ethyl, n-propyl, isopropyl, n-butyl, isobutyl, n-pentyl, n-hexyl, or isohexyl. Examples of aryl groups include phenyl, naphthyl, anthracenyl, pyridyl, and styryl.

According to formula (I), Z represents the atoms necessary to complete a substituted or unsubstituted heterocyclic nucleus of the type known to be useful in merocyanine or cyanine dyes. Preferably, Z is a 5- or 6-membered that may be unsubstituted or substituted either with substituents appended thereto or with substituents that form a fused ring system with Z. Examples of heterocyclic rings useful as Z include thiazoles, benzothiazoles, naphthothiazoles, indoles, benzindoles, imidazoles, benzimidazoles, naphthimidazoles, oxazoles, benzoxazoles, naphthoxazoles, selenazoles, benzoselenazoles, naphthoselenazoles, thiazolines, oxazolines, quinolines, pyridines, and others known in the dye art. The Z nucleus may be substituted with substituents, such as halogen (e.g., chloro, fluoro, bromo), alkoxy (e.g., methoxy, ethoxy), alkyl, aryl (e.g., phenyl), alkaryl (e.g., benzyl), aralkyl, and others known in the art. In one preferred embodiment, Z represents the atoms necessary to complete a substituted or unsubstituted benzoxazole or oxazole nucleus.

Examples of dyes according to formula (I) include the following:

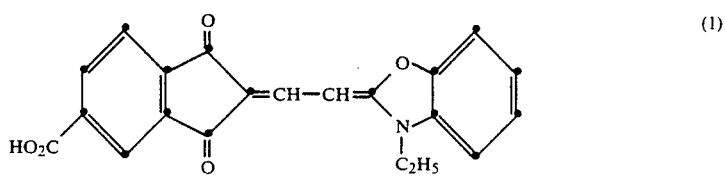

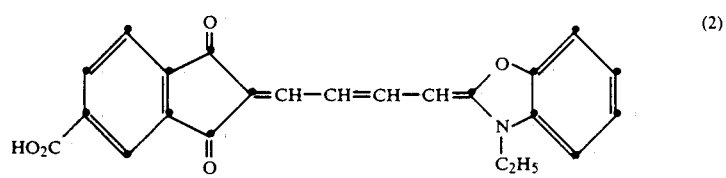
(2)
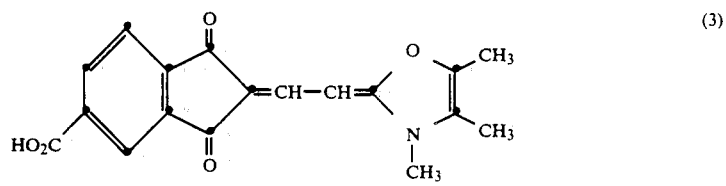
(3)
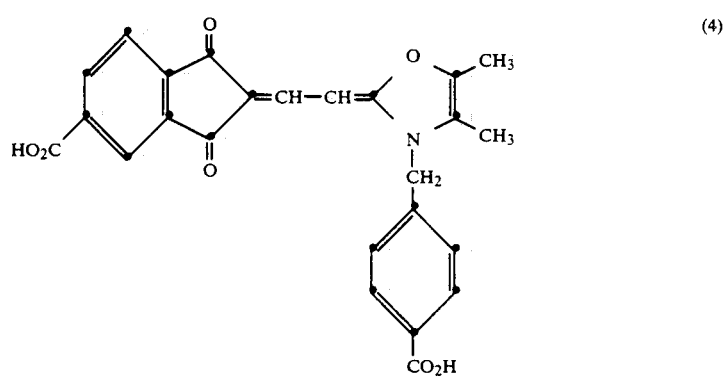
(4)
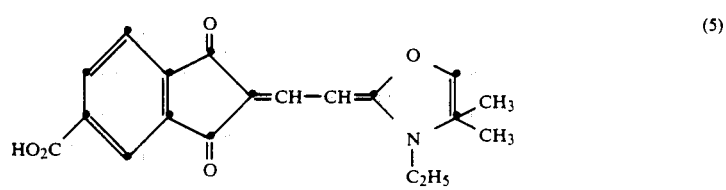
(5)
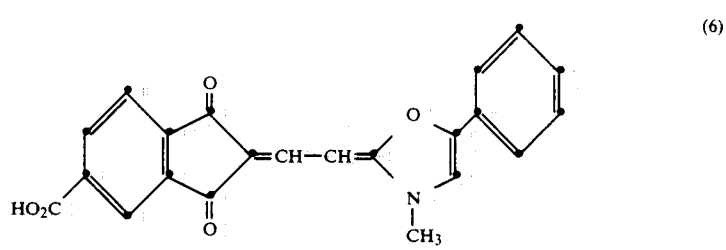
(6)
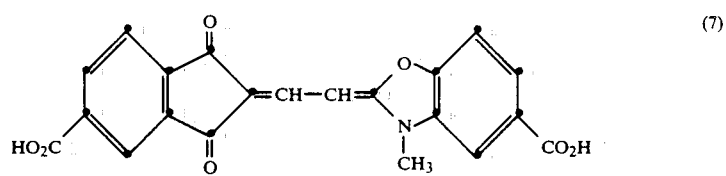
(7)
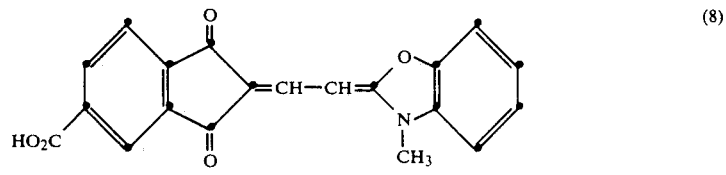
(8)

-continued
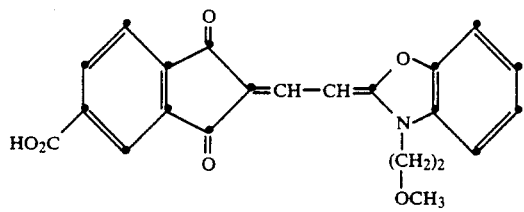 (9)
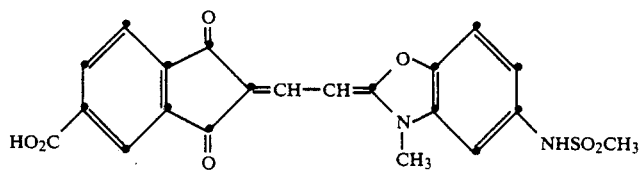 (10)
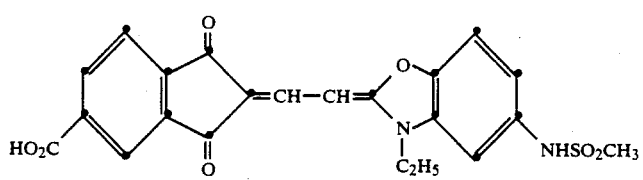 (11)
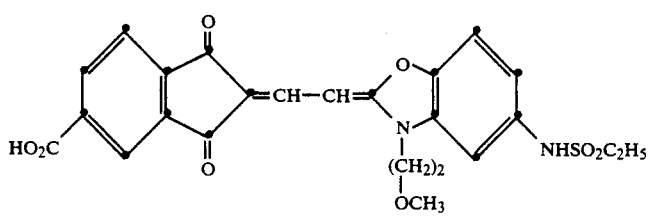 (12)
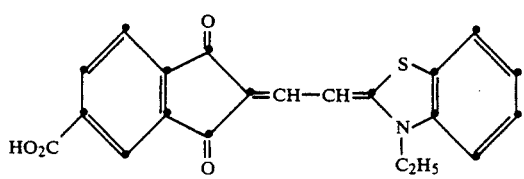 (13)
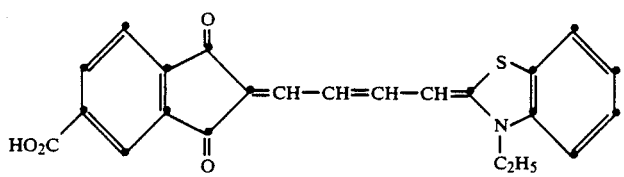 (14)
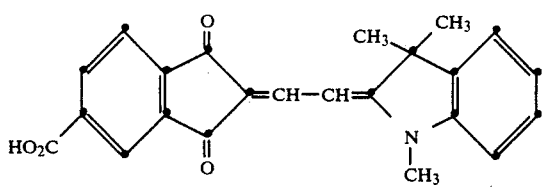 (15)
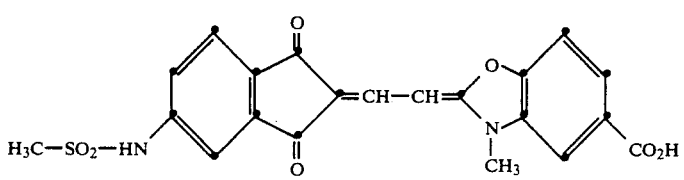 (16)

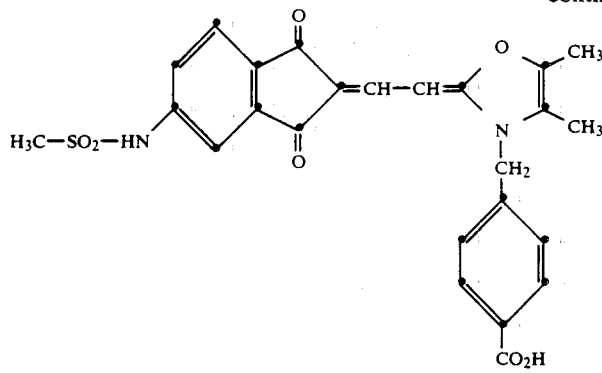

(17)

The dyes of formula (I) can be prepared by synthetic techniques well-known in the art, as illustrated by the synthetic examples below. Such techniques are further illustrated, for example, in "*The Cyanine Dyes and Related Compounds*", Frances Hamer, Interscience Publishers, 1964.

The dyes of formula (I) may be incorporated in a hydrophilic layer of a photographic element in any known way (e.g., with the aid of a high-boiling non-polar organic solvent), but are preferably in the form of a solid particle dispersion (i.e., the dye is in the form of solid particles of microscopic size) for incorporation into a layer such as a hydrophilic colloid layer of a photographic element. The solid particle dispersion can be formed by precipitating the dye in the form of a dispersion and/or by well-known milling techniques, e.g., ball milling, sand-milling, or colloid milling (preferably ball-milling or sand-milling) the dye in the presence of a dispersing agent. The dispersion of dye particles should have a mean diameter of less than 10 μm and Preferably less than 1 μm. The dye particles can be prepared in sizes ranging down to about 0.01 μm.

The dyes may be located in any layer of the element where it is desirable to absorb light, but it is particularly advantageous to locate them in a layer where they will be solubilized and washed out during processing. Useful amounts of dye range from 1 to 1000 mg/m$^2$. The dye should be present in an amount sufficient to yield an optical density at the absorbance D-max in the visible region before processing of at least 0.10 density units and preferably at least 0.50 density units. This optical density will generally be less than 5.0 density units for most photographic applications.

The hydrophilic binder used in the present invention :an be any known type, such as a hydrophilc colloid (e.g., gelatin), synthetic polymers (e.g., polyvinyl alcohol), and the like, as are well-known in the art.

The support of the element of the invention can be any of a number of well-known supports for photographic elements. These include polymeric films such as cellulose esters (e.g., cellulose triacetate and diacetate) and polyesters of dibasic aromatic carboxylic acids with divalent alcohols (e.g., poly(ethylene terephthalate)), paper, and polymer-coated paper. Such supports are described in further detail in *Research Disclosure*, Dec. 1978, Item 17643 [hereinafter referred to as *Research Disclosure*], Section XVII.

The radiation-sensitive layer of the element of the invention can contain any of the known radiation-sensitive materials, such as silver halide, diazo image-forming systems, light-sensitive tellurium-containing compounds, light-sensitive cobalt-containing compounds, and others described in, for example, J. Kosar, Light-Sensitive Systems: Chemistry and Application of Non-silver Halide Photographic Processes, J. Wiley & Sons, N.Y. (1965). Radiation sensitive materials exhibiting sensitivity to blue light and especially those sensitive to blue light and at least some other wavelength of radiation are preferred, as the dyes according to the invention can be advantageously used to absorb some or all of the blue light.

Silver halide is especially preferred as a radiation-sensitive material. Silver halide emulsions can contain, for example, silver bromide, silver chloride, silver iodide, silver chlorobromide, silver chloroiodide, silver bromo-iodide, or mixtures thereof. The emulsions can include coarse, medium, or fine silver halide grains bounded by 100, 111, or 110 crystal planes. Silver halide emulsions and their preparation are further described in *Research Disclosure*, Section I. Also useful are tabular grain silver halide emulsions, as described in *Research Disclosure*, Jan. 1983, Item 22534 and U.S. Pat. No. 4,425,426.

The radiation-sensitive materials described above can be sensitized to a particular wavelength range of radiation, such as the red, blue, or green portions of the visible spectrum, or to other wavelength ranges, such as ultraviolet, infrared, and the like. Sensitization of silver halide can be accomplished with chemical sensitizers such as gold compounds, iridium compounds, or other group VIII metal compounds, or with spectral sensitizing dyes such as cyanine dyes, merocyanine dyes, styryls, or other known spectral sensitizers. Additional information on sensitization of silver halide is described in *Research Disclosure*, Sections I–IV.

The dyes of formula (I) where n is 0 tend to absorb light in the blue portion of the spectrum, and are thus useful in many applications requiring the use of a blue-absorbing filter dyes. For example, they can be used as interlayer dyes, trimmer dyes, or antihalation dyes. They can be used to prevent crossover in X-ray materials, to prevent unwanted blue light from reaching the green-sensitive emulsion layer of a multicolor photographic element, and other uses as indicated by the absorbance spectrum of the particular dye. The dyes can be used in a separate filter layer or as an intergrain absorber.

Multicolor photographic elements according to the invention generally comprise a blue-sensitive silver halide layer having a yellow color-forming coupler associated therewith, a green-sensitive layer having a magenta color-forming coupler associated therewith, and a red-sensitive silver halide layer having a cyan color-forming coupler associated therewith. Color photographic elements and color-forming couplers are well-known in the art and are further described in *Research Disclosure*, Section VII.

The element of the invention can also include any of a number of other well-known additives and layers, as described in *Research Disclosure*. These include, for example, optical brighteners, antifoggants, image stabilizers, light absorbing materials such as filter layers or intergrain absorbers, light-scattering materials, gelatin hardeners, coating aids and various surfactants, overcoat layers, interlayers and barrier layers, antistatic layers, plasticizers and lubricants, matting agents, development inhibitor-releasing couplers, bleach accelerator-releasing couplers, and other additives and layers known in the art.

The dye of formula (I) can be located in any layer of a photographic element where it is desired to absorb light. In a preferred embodiment, the dye is preferably located in a layer where it will be subjected to high pH (i.e., 8 to 12) and/or sulfite during photographic processing, so as to allow the dye to be solubilized and removed or decolorized.

The photographic elements of the invention, when exposed, can be processed to yield an image. During processing, the dye of formula (I) will generally be decolorized and/or removed. Following processing, the dye of the invention should contribute less than 0.10 density unit, and preferably less than 0.02 density unit to the absorbance D-max in the visible region in the minimum density areas of the exposed and processed element.

Processing can be by any type of known photographic processing, as described in *Research Disclosure*, Sections XIX–XXIV, although it preferably includes a high pH (i.e., 8 or above) step utilizing an aqueous sulfite solution in order to maximize decolorization and removal of the dye. A negative image can be developed by color development with a chromogenic developing agent followed by bleaching and fixing. A positive image can be developed by first developing with a non-chromogenic developer, then uniformly fogging the element, and then developing with a chromogenic developer. If the material does not contain a color-forming coupler compound, dye images can be produced by incorporating a coupler in the developer solutions.

Bleaching and fixing can be performed with any of the materials known to be used for that purpose. Bleach baths generally comprise an aqueous solution of an oxidizing agent such as water-soluble salts and complexes of iron (III) (e.g., potassium ferricyanide, ferric chloride, ammonium of potassium salts of ferric ethylenediaminetetraacetic acid), water-soluble persulfates (e.g., potassium, sodium, or ammonium persulfate), water-soluble dichromates (e.g., potassium, sodium, and lithium dichromate), and the like. Fixing baths generally comprise an aqueous solution of compounds that form soluble salts with silver ions, such as sodium thiosulfate, ammonium thiosulfate, potassium thiocyanate, sodium thiocyanate, thiourea, and the like.

The invention is further illustrated by the following Example:

EXAMPLE 1-SYNTHESIS OF DYE 1

A slurry of 8.68 g (0.02 mole) 2-acetanilidovinyl-3-ethylbenzoxazolium iodide, 5.2 g (0.02 mole) of 5-carboxy-2-ethoxycarbonyl 1,3-indandione, and 30 ml of N-methylpyrrolidinone was heated at 150° C. for 30 minutes. During this time, the starting materials dissolved and precipitate formed. The crude product slurry was then cooled to room temperature, diluted with 100 ml of acetone, and stirred for 30 minutes. The precipitate was collected by filtration and washed with acetone. The weight of crude brick orange product was 5.02 g. The dye was purified by consecutive slurrying in refluxing glacial acetic acid, then acetone. The weight of pure dye was 4.8 g (66.5% yield), having a melting point greater than 300° C. All analytical data were consistent with the dye structure.

EXAMPLE 2-SYNTHESIS OF DYE 2

A slurry of 2.3 grams (5 mMol) 2-(4-acetanilido-1,3-butadienylidene)3-ethylbenz-oxazolium iodide, 2.6 grams (10 mMol)of 5-carboxy2-ethoxycarbonyl1,3-indandione, and 10 mL of N-methylpyrralidinone was heated at 125° C. for 20 min. The resulting red-purple reaction mixture was cooled and poured into 150 mL of ethyl acetate with rapid stirring. The 2.3 grams of resulting impure product was purified by repetitive slurries in refluxing acetone to afford 0.70 grams (1.8 mMol, 36.1% yield) of pure dye, having a melting point greater than 300° C.

Additional dyes were prepared in a similar manner. The absorbance maximum, in methanol solution containing a trace of triethylamine, for the Dyes 1, 2, 3, 13, 14 and 15 are shown in Table 1 below.

TABLE 1

| Dye | λmax (nm) | Dye | λmax (nm) |
|---|---|---|---|
| 1 | 471 | 13 | 508 |
| 2 | 565 | 14 | 602 |
| 3 | 440 | 15 | 496 |

EXAMPLE 3-RETAINED DYE STAIN EVALUATION

Dye 1 was prepared as a solid particle dispersion by ball-milling according to the following procedure. Water (21.7 ml) and a 6.7% solution of Triton X-200 ® surfactant (2.65 g) were placed in a 60 ml screw-capped bottle. A 1.00 g sample of dye was added to this solution. Zirconium oxide beads (40 ml, 2 mm diameter) were added and the container with the cap tightly secured was placed in a mill and the contents milled for four days. The container was removed and the contents added to a 12.5% aqueous gelatin (8.0 g) solution. The new mixture was placed on a roller mill for 10 minutes to reduce foaming and the resulting mixture was filtered to remove the zirconium oxide beads. The resulting dye dispersion had no particle with a mean diameter over 1.0 μm.

The solid particle dispersions of this dye was coated on a polyester support according to the following procedure. A spreading agent (surfactant 10G ®) and a hardener (bis(vinylsulfonylmethyl) ether) were added to the dye gelatin melt prepared as described above. A melt from this mixture was then coated on a poly(ethylene terephthalate) support to achieve a dye coverage of 0.32 g/m², a gelatin coverage of 1.60 g/m², a spreading agent level of 0.096 g/m², and a hardener level of 0.016 g/m², The absorbance of the dye dispersion was measured with a spectrophotometer, yielding an optical density of 1.90 at a λ-max of 430 nm. An identical element was subjected to a 5 minute distilled water wash, and to Kodak E-6 ® Processing (which is described in *British Journal of Photography Annual*, 1977, pp. 194–97) and the absorbance was measured for each. The density remained virtually unchanged after the water wash, with a value of 1.84 at a λ-max of 428 nm. After processing, however, the coating exhibited an optical density of only 0.01.

These results show that the dye was not affected by the water wash, indicating no wandering at coating pH, but was fully solubilized for removal and/or decolorization by the photographic processing to which it was subjected.

The invention has been described in detail with reference to preferred embodiments thereof. It should be understood, however, that variations and modifications can be made within the spirit and scope of the invention.

What is claimed is:

1. A photographic element comprising a support having thereon a radiation-sensitive layer and a hydrophilic layer, which is the same as or different from the radiation-sensitive layer, comprising a hydrophilic binder and a filter dye having the formula:

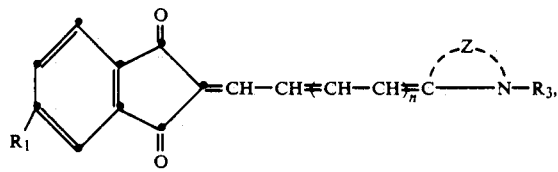

wherein
n is 0 or 1,
$R_1$ is $CO_2H$ or $NHSO_2R_2$ where $R_2$ is substituted or unsubstituted alkyl or substituted or unsubstituted aryl,
$R_3$ is substituted or unsubstituted alkyl or substituted or unsubstituted aryl, and
Z represents the atoms necessary to complete a substituted or unsubstituted heterocyclic nucleus.

2. A photographic element according to claim 1 wherein $R_2$ and $R_3$ are each independently substituted or unsubstituted alkyl of from 1 to 6 carbon atoms or substituted or unsubstituted aryl of from 6 to 12 carbon atoms.

3. A photographic element according to claim 1 wherein $R_1$ is $NHSO_2R_2$.

4. A photographic element according to claim 1 wherein $R_1$ is $CO_2H$.

5. A photographic element according to claim 1 wherein Z represents the atoms necessary to complete a substituted or unsubstituted 5- or 6-membered heterocyclic nucleus.

6. A photographic element according to claim 1 wherein Z represents the atoms necessary to complete a substituted or unsubstituted oxazole or benzoxazole nucleus.

7. A photographic element according to claim 1 wherein n is 0.

8. A photographic element according to claim 1 wherein the dye is in the form of a solid particle dispersion.

9. A photographic element according to claim 8 wherein the particles in said dispersion consist essentially of said dye.

10. A photographic element according to claim 8 wherein said dispersion has a mean diameter of from about 0.01 to 10 μm.

11. A photographic element according to claim 8 wherein said dispersion has a mean diameter of from about 0.01 to 1 μm.

12. A photographic element according to claim 1 wherein the filter dye layer is a different layer than the radiation-sensitive layer on the same side of the support as the radiation-sensitive layer.

13. A photographic element according to claim 8 wherein the filter dye layer is a different layer than the radiation-sensitive layer on the same side of the support as the radiation-sensitive layer.

* * * * *